United States Patent [19]
Mayer, Sr.

[11] 3,966,183
[45] June 29, 1976

[54] ARTICLE INCLUDING AN ENDLESS COIL SPRING

[75] Inventor: Salvador Escobar Mayer, Sr., Mexico City, Mexico

[73] Assignees: David Dweck, Brooklyn; Maurice Zalta, Woodmere; Camel Cohen, Brooklyn, all of N.Y.; Robert Cohen, Deal, N.J. ; a part interest to each

[22] Filed: Apr. 26, 1974

[21] Appl. No.: 464,638

[52] U.S. Cl. .................................. 267/167; 63/5 A
[51] Int. Cl.² ........................................... F16F 1/06
[58] Field of Search ............... 267/167; 63/5 R, 5 A, 63/11

[56] References Cited
UNITED STATES PATENTS

| | | | |
|---|---|---|---|
| 3,087,038 | 4/1963 | Bethke | 267/167 |
| 3,250,331 | 5/1966 | Boyle | 267/167 |
| 3,323,785 | 6/1967 | Mather | 267/167 |
| 3,468,527 | 9/1969 | Mather | 267/167 |

Primary Examiner—James B. Marbert
Attorney, Agent, or Firm—Steinberg & Blake

[57] ABSTRACT

An endless coil spring whose convolutions surround a substantially circular line which extends through the hollow interior of the coil spring. This line surrounds inner portions of the convolutions which press against each other. The convolutions have outer portions which surround the line and which are spaced from each other with these outer portions of the convolutions circumferentially offset with respect to the inner portions thereof.

9 Claims, 10 Drawing Figures

ARTICLE INCLUDING AN ENDLESS COIL SPRING

BACKGROUND OF THE INVENTION

The present invention relates to articles which include coil springs.

In particular, the present invention relates to articles of this type which include endless coil springs.

It has already been proposed to provide an endless coil spring which may be worn by an individual on a finger in the manner of a ring. Such a conventional coil spring has convolutions which are positioned substantially radially with respect to the center of a circle along which the coil spring extends, so that such a coil spring has an undesirably large thickness corresponding to the diameter of the convolutions. Such a coil spring is extremely uncomfortable to use because it presses uncomfortably against fingers which adjoin the finger on which the spring is worn in the manner of a ring.

To avoid this latter drawback it has already been proposed to provide coil springs which have permanently flattened convolutions, such coil springs being used, for example, as a wrist band or bracelet. However, the drawback of this type of construction resides in the fact that the permanent flattening of the convolutions is inconvenient to carry out and undesirably increases the cost of the article as well as detracting from the attractive appearance thereof and the ease of which the article is used.

SUMMARY OF THE INVENTION

It is accordingly a primary object of the present invention to provide an endless coil spring which will avoid the above drawbacks.

Thus, it is an object of the present invention to provide an endless coil spring which without having its convolutions permanently deformed nevertheless is capable of assuming on a body which is surrounded by the coil spring a condition where the convolutions extend either radially or where the convolutions are inclined with outer regions thereof circumferentially offset with respect to inner regions thereof so that the thickness of the coil spring is substantially reduced.

A further object of the present invention is to provide a method for conveniently and inexpensively manufacturing an endless coil spring of the above type.

According to the invention the endless coil spring has a substantially circular configuration with its convolutions being wound around a substantially circular line which extends through the hollow interior of the coil spring. The diameter of this substantially circular line is such that the convolutions have inner portions surrounded by the line and pressing against each other while the convolutions also have outer portions extending along a circle which surrounds the above line with these outer portions being spaced from each other.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
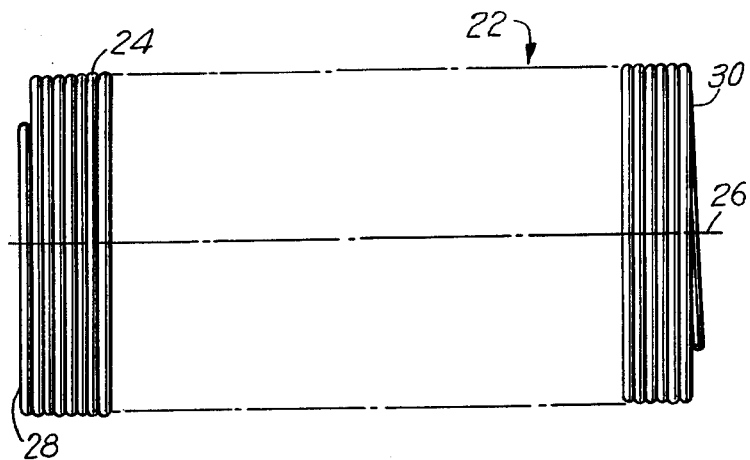
FIG. 1 shows in elevation an elongated coil spring from which the coil spring of the present invention is manufactured.
Figure 3:
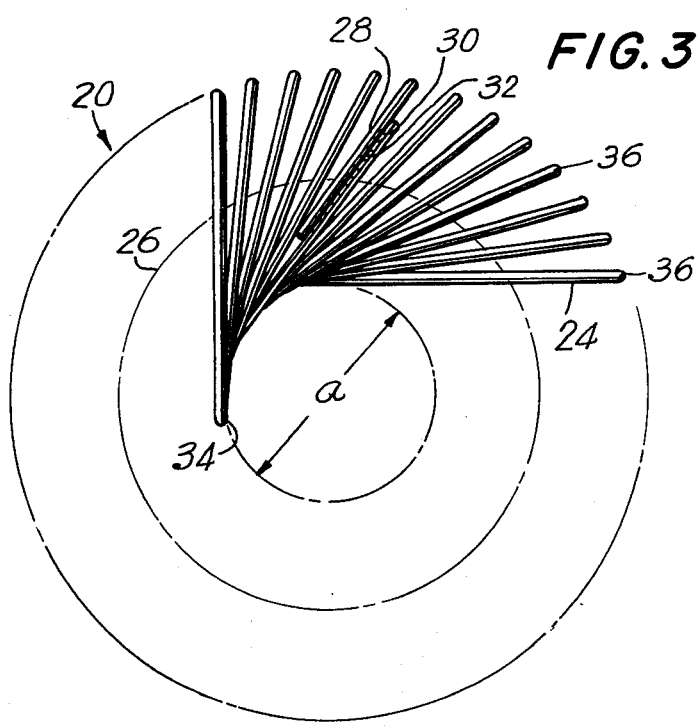
FIG. 3 shows in elevation the coil spring of the present invention.

Referring now to the drawings, there is illustrated in FIG. 3 an endless coil spring 20 constructed in accordance with the present invention. This endless coil spring 20 of FIG. 3 is made from an initially elongated coil spring 22 which is illustrated in FIG. 1. The elongated coil spring 22 has a series of convolutions 24 which are wound around a line 26 which extends through the hollow interior of the coil spring 22. These convolutions 24 press against each other along the entire length of the coil spring 22 from its end convolution 28 to the opposed end convolution 30 thereof.

In order to manufacture the endless coil spring 20 from the substantially straight coil spring 22 of FIG. 1, the coil spring 22 is curved so as to place the end convolutions 28 and 30 in engagement with each other as illustrated in FIG. 3. Thus as may be seen from FIG. 3 the end convolutions 28 and 30 are placed one beside the other, directly engaging and overlapping each other, and in this condition the end convolutions 28 and 30, which may be held by a pair of pliers, for example, are fixed to each other as by being soldered or otherwise joined together. FIG. 3 schematically illustrates a line of solder 32 or other material used for fixing the end convolutions 28 and 30 to each other.

The length which is selected for the spring 22 is such that when the convolutions 28 and 30 engage each other, the line 26 assumes a substantially circular configuration as illustrated in FIG. 3. The diameter of the circle along which the line 26 extends, at least substantially, is small enough to maintain inner portions 34 of the convolutions 24 still pressing against each other, these inner portions 34 determining the inner diameter $a$ of the endless coil spring 20 shown in FIG. 3 when the coil spring is uninfluenced by exterior forces and responds only to its own inherent resiliency. However, the diameter of the circle along which the line 26 at least substantially extends is large enough so that the outer portions 36 of the several convolutions 24 are spaced from each other.

Figure 2:
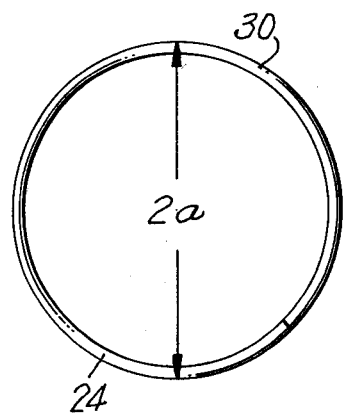
FIG. 2 is an end view of the coil spring of FIG. 1.

As is apparent from FIG. 2, the convolutions 24 as well as the end convolutions 28 and 30 are of a circular configuration. It has been found that satisfactory results are obtained in accordance with the present invention if the diameter of the convolutions 24, including the end convolutions 28 and 30, is approximately $2a$, or in other words approximately twice the inner diameter $a$ of the endless coil spring 20.

Figure 4:
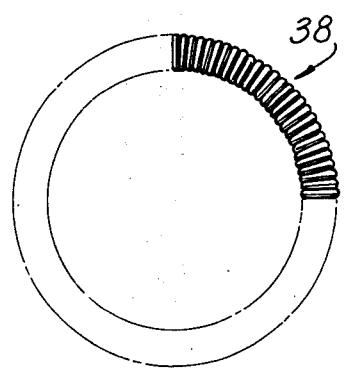
FIG. 4 shows in elevation a prior art coil spring.

This endless coil spring 20 which is shown in FIG. 3 is to be distinguished from a prior art type of known endless coil spring 38 as illustrated in FIG. 4. The coil spring 38, while being endless, has such a large inner diameter that the convolutions of the coil spring 38 remain pressing against each other when the coil spring has the circular configuration shown in FIG. 4. In accordance with the invention the inner diameter of the coil spring is made small enough so that while the inner portions 34 of the convolutions 24 still press against each other nevertheless the outer portions 36 are spaced from each other.

Figure 5:
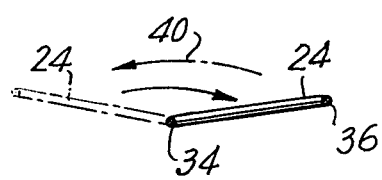
FIG. 5 is a schematic representation of the manner in which the convolutions of the coil spring of FIG. 3 operate.

As may be seen from FIG. 5, which schematically illustrates the manner in which the convolutions 24 act, each convolution 24 has at its inner portion 34 what amounts to a torsion bar. The springy characteristic of the inner portion 34 is such that it seeks to maintain the convolution 24 in the inclined solid line position shown in FIG. 5. Thus, the series of convolutions 24 will have with respect to each other the relationship shown in FIG. 6 according to which the outer portions 36 are circumferentially offset with respect to the inner portions 34, and thus the convolutions 24 do not extend radially with respect to the center of the circle 26. As a result the outer portions 36 are located, only by the inherent resiliency of the spring itself, along a circle whose diameter is smaller than the diameter of a circle along which these outer portions 36 would extend if the convolutions 24 were radially arranged with respect to the center of the circle 26.

Figure 6:
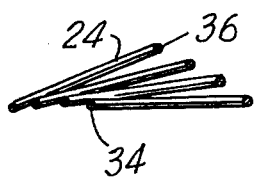
FIG. 6 is a partly sectional elevation of one position which the convolutions of the spring of FIG. 3 take.
Figure 7:
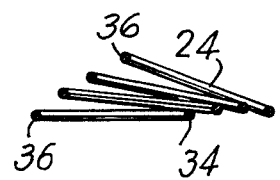
FIG. 7 is a partly sectional schematic illustration of another position which the convolutions of the coil spring of FIG. 3 take.

However, the structure does not necessarily remain stable only in the position shown in FIG. 6. Thus it is possible for the operator to swing each convolution 24 about its inner portion 34 in a counterclockwise direction, as indicated by the dotted arrow 40 in FIG. 5, and after any convolution 24 has been turned in this manner through a given increment all of the convolutions will snap into the dotted line position shown for the convolution 24 in FIG. 5, as a result of the springy torsion bar characteristic of the inner portion 34 of the several convolutions 24. Thus it is possible also for the convolutions 24 to remain stably in the condition shown in FIG. 7 where the outer portions 36 are circumferentially offset with respect to the inner portions 34 of the convolutions 24, but in a direction opposite to that which is shown in FIG. 6.

Figure 8:
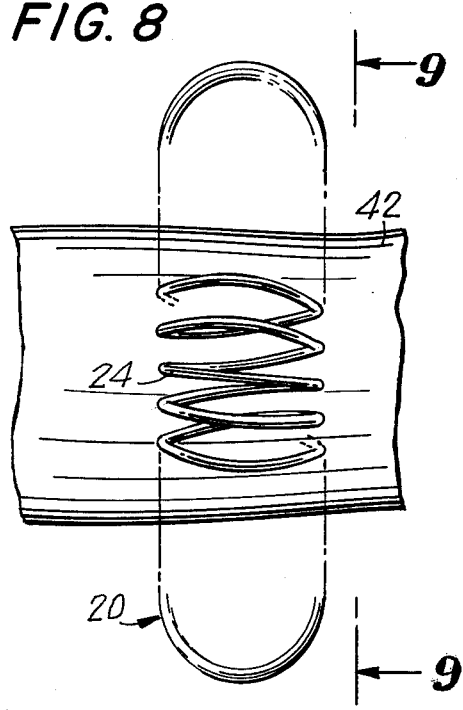
FIG. 8 is a partly fragmentary elevation illustrating the manner in which the spring of FIG. 3 may be used.
Figure 9:
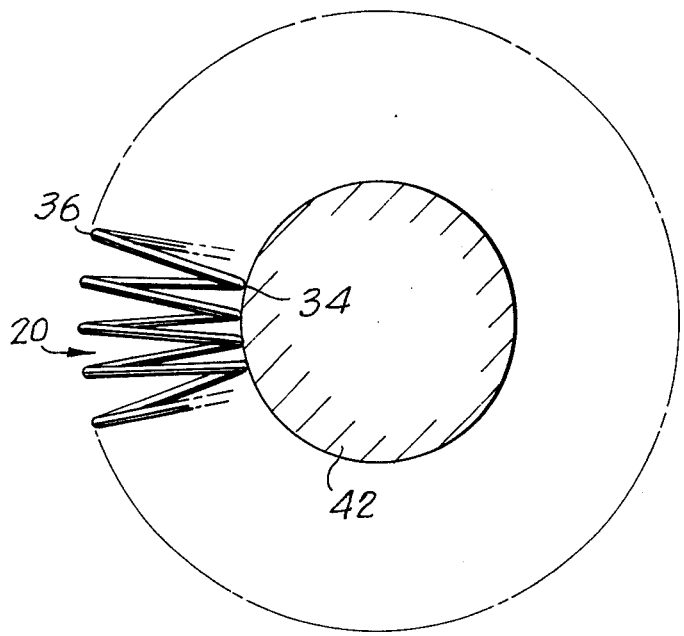
FIG. 9 is a partly sectional end view of the arrangement of FIG. 8 taken along line 9—9 of FIG. 8 in the direction of the arrows.

The manner in which the article 20 of the present invention is to be used is illustrated in FIGS. 8-11. Thus, FIG. 8 shows how the spring 20 is stretched onto an elongated body 42 which has a diameter as illustrated in FIG. 9. Although the body 42 may be in the form of an elongated rod of circular cross section, as illustrated, it will be understood that this rod 42 is illustrated only for convenience in demonstrating the method for using the spring of the invention which is illustrated in FIG. 3. Thus the body 42 may in practice be a wrist or finger of an individual who wears the spring 20 in the manner of a bracelet or ring, respectively. The diameter of the body 42 is such that when the spring 20 is placed on the body 42, the inner portions 34 of the convolutions 24 are spaced slightly from each other and the outer portions 36 are also spaced from each other, with the diameter of the body 42 being such that the convolutions 24 will remain stably in the condition shown in FIG. 9 where the outer portions 36 are circumferentially aligned with the inner portions 34. However if one or more of the outer portions 36 are displaced in a clockwise direction, as viewed in FIG. 9, through a sufficient increment, all of the convolutions 24 will snap into the condition shown in FIG. 10 where the outer portions 36 are circumferentially offset with respect to the inner portions 34, so that as a result the outer diameter of the spring 20 is in FIG. 10 substantially less than its outer diameter in FIG. 9, and thus the thickness of the endless coil spring is substantially reduced in FIG. 10 as compared with its condition in FIG. 9.

Figure 10:
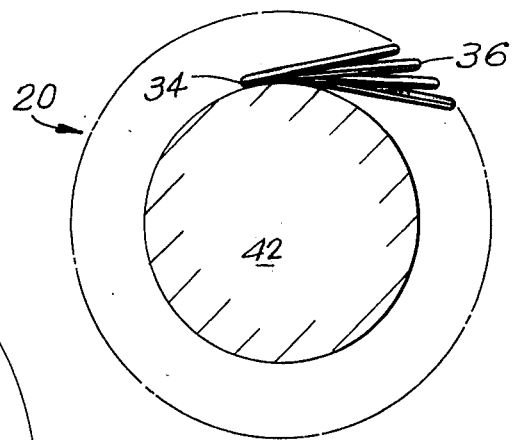
FIG. 10 illustrates a further position which the structure of FIG. 9 may take.
Figure 11:
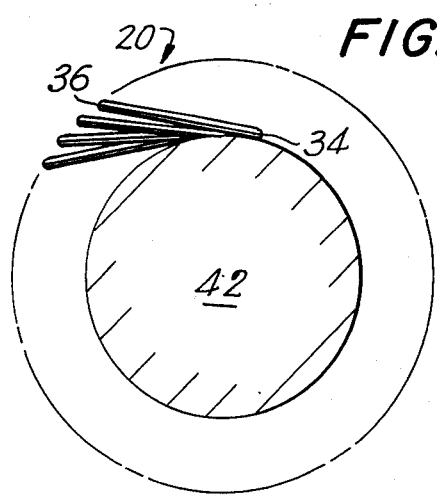
FIG. 11 illustrates yet another position which the structure of FIG. 9 may take.

FIG. 11 shows the condition where one or more of the outer portions 36 of the spring 20 in FIG. 9 have been displaced in a counterclockwise direction to provide the spring with the configuration illustrated in FIG. 11. This configuration is identical with that of FIG. 10 except that the several convolutions 24 are inclined in a direction opposite to that which is illustrated in FIG. 10.

Figure 12:
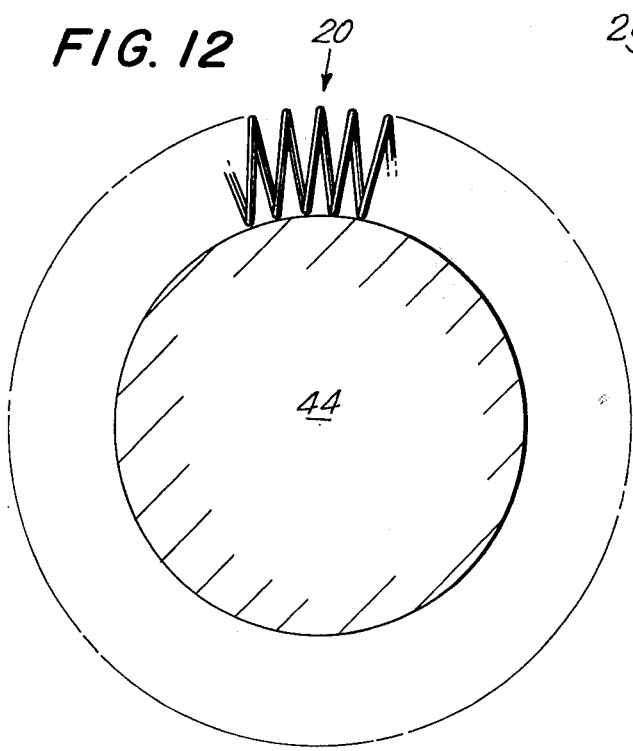
FIG. 12 is an illustration of how the spring of FIG. 3 operates when situated on a body of relatively large cross section.

FIG. 12 shows the spring 20 situated on a body 44 whose diameter is much larger than the diameter of the body 42. If the diameter of the body on which the spring is placed is too large, as shown in FIG. 12, then the tension between the several convolutions will be so great that the convolutions will only remain in a condition where their outer portions are circumferentially aligned with their inner portions and it will not be possible for the torsion at the inner portions 34 to overcome the tension from one convolution to the next with the condition as illustrated in FIG. 12.

In actual practice it has been found that for an average wrist size the results shown in FIGS. 9-11 are achieved where the inner diameter $a$ of the coil spring is on the order of one-half inch while the diameter $2a$ of the convolutions is on the order of 1 inch. When used as a ring to surround a finger it has been found that satisfactory results have been achieved when the inner diameter $a$ is on the order of one-fourth inch while the convolutions 24 each have a diameter $2a$ on the order of one-half inch.

The endless coil spring of the invention is made from a relatively fine spring wire which is painted so as to have a desired color or otherwise coated to prevent corrosion. Thus the spring wire may be coated with chromium or the like to give the spring 20 a white color, or it may be coated with a bronze or similar yellow metal to give the spring a gold color while opposing corrosion.

Figure 13:
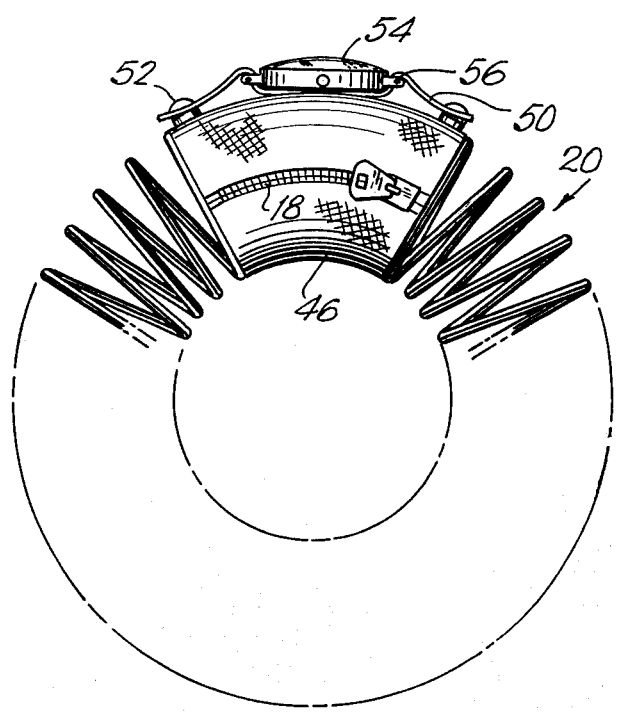
FIG. 13 illustrates how the spring of FIG. 3 may form part of a watch and watch band assembly.
Figure 14:
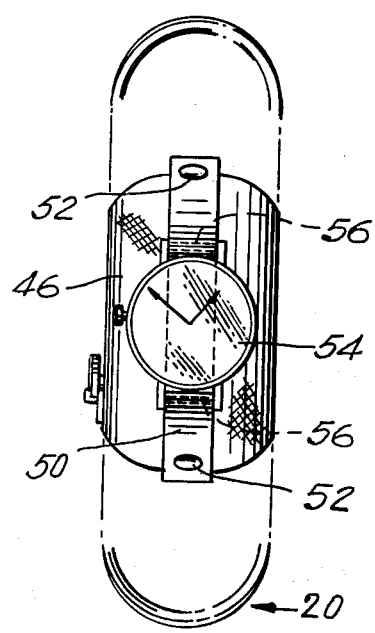
FIG. 14 is a top plan view of the structure of FIG. 13.

Thus, the spring 20 of the invention can be used as a decorative bracelet or ring in the manner described above and shown in FIGS. 9-11. However it is also possible for the spring of the invention to have other uses. For example FIGS. 13 and 14 illustrate how the spring 20 may form part of an article in the form of a watch and watch band assembly. Thus, FIG. 13 shows the spring 20 of the invention in a stretched condition extending through a tubular sleeve 46 made of any suitable flexible sheet material which can be passed around the spring in the manner illustrated with opposed side edges of the sheet material 46 releasably fastened together as by a slide fastener 48 shown in FIG. 13, although other means may be used for releasably fastening the sleeve 46 around the spring.

The sleeve 46 has fastened to its exterior an elongated flexible band 50 which may be releasably fastened with the sleeve 46 as by utilizing suitable snap fasteners 52 (FIG. 14). The band 50 passes beneath a watch 54 and around a pair of fastening rods 56 carried by the case of the watch at opposed sides thereof, as is conventional. Thus through this simple arrangement it is possible to utilize the spring 20 of the invention as a watch band. The spring easily expands to pass over the hand of the wearer of the article of FIGS. 13 and 14, and once the spring is situated on the wrist it can be flattened to the condition shown either in FIG. 10 or in FIG. 11 so that the bulk, or space occupied by the structure, is substantially reduced as described above.

Figure 15:
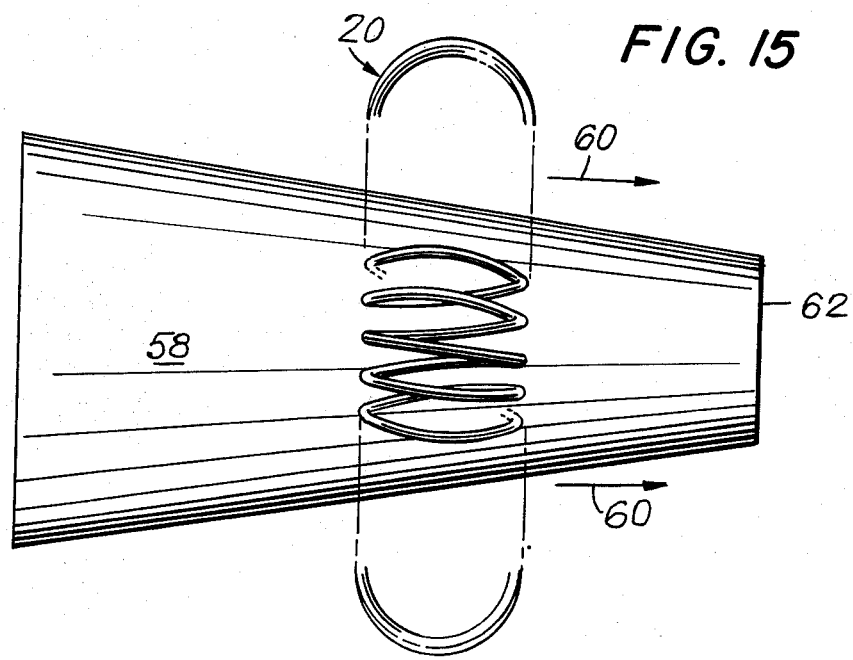
FIG. 15 illustrates how the spring of FIG. 3 may be used as part of a toy or game.

FIG. 15 illustrates another manner in which the device of the invention may be used. Thus it is possible to stretch the spring 20 onto an elongated body 58 which may have a circular cross section and which has an outer surface of a low coefficient of friction which is tapered as illustrated in FIG. 15. When the spring 20 is stretched onto the outer surface of the body 58 and released, the spring 20 will automatically contract itself while automatically displacing itself toward the smaller end of the body 58, as shown by the arrows 60 in FIG. 15. By providing for the body 50 a smaller end 62 which still maintains the spring 20 in a stretched condition when the spring 20 reaches the end 62, the spring 20 will continue to propel itself in a direction of the arrow 60 beyond the body 58 forming a projectile which may be aimed at a suitable target, so that the assembly of FIG. 15 forms a game or toy. When utilizing such a game or toy it will be found that the operation can be varied in accordance with whether the convolutions are maintained in the condition shown in FIG. 9 or in the condition shown either in FIG. 10 or in FIG. 11. Thus in this way the spring 20 of the invention provides a variation in the operation of the assembly of FIG. 15 calling for a certain degree of skill in order to achieve a trajectory which will carry the projectile formed by the spring 20 closer to a given target.

It is thus apparent that the spring 20 of the present invention lends itself to a wide variety of uses. It may be made in different sizes so that it can be used by itself either in the manner of a bracelet or a ring, or it may be combined with other components as shown in FIGS. 13–15, for example, to achieve advantages in a number of different articles.

What is claimed is:

1. An article comprising an endless coil spring of substantially circular configuraton having, only as a result of the inherent resiliency of the coil spring itself, convolutions wound around a substantially circular line which extends through the hollow interior of the endless coil spring, said convolutions having inner portions which press against each other and determine the inner diameter of the endless coil spring and outer portions which are spaced from each other and determine the outer diameter of the endless coil spring, said outer portions of said convolutions being circumferentially offset with respect to the inner portions thereof, when the coil spring is not acted upon by any outside force and responds only to its inherent resiliency, so that the outer diameter of the coil spring is smaller than the outer diameter which it would have if the convolutions were arranged substantially radially with respect to the center of a circle along which said line extends at least substantially.

2. The article of claim 1 and wherein the coil spring is made of a springy wire which is coated with a material which resists corrosion.

3. The combination of claim 2 and wherein the material gives the coil spring a white color.

4. The combination of claim 2 and wherein the material gives the coil spring a gold color.

5. The article of claim 1 including a device connected to and carried by the endless coil spring.

6. The combination of claim 5 and wherein the device is a watch.

7. The article of claim 1 and including an elongated body on which the endless coil spring is adapted to be positioned in a stretched condition surrounding the body, said body having an exterior tapered surface of a low coefficient of friction the size and configuration of which enables the spring to automatically contract while displacing itself toward a smaller end of the body.

8. The combination of claim 7 and wherein said body terminates in a small end the size of which is still large enough to provide tension in the endless coil spring when it is situated at the latter end of said body so that the coil spring will propel itself beyond the small end of said body to form a projectile.

9. The article of claim 1 and wherein each convolution is of a substantially circular configuration and has a diameter which is approximately twice the inner diameter of the endless coil spring.

* * * * *